United States Patent
Kang et al.

(10) Patent No.: US 9,990,940 B1
(45) Date of Patent: Jun. 5, 2018

(54) SEED STRUCTURE FOR PERPENDICULAR MAGNETIC RECORDING MEDIA

(71) Applicant: WD Media, LLC, San Jose, CA (US)

(72) Inventors: Kyongha Kang, Fremont, CA (US); Daehoon Hong, Fremont, CA (US); Sy Vu, San Jose, CA (US); Chester C. H. Lo, Milpitas, CA (US)

(73) Assignee: WD Media, LLC, San Jose, CA (US)

( * ) Notice: Subject to any disclaimer, the term of this patent is extended or adjusted under 35 U.S.C. 154(b) by 296 days.

(21) Appl. No.: 14/586,727

(22) Filed: Dec. 30, 2014

(51) Int. Cl.
| G11B 5/66 | (2006.01) |
| G11B 5/127 | (2006.01) |
| G11B 5/667 | (2006.01) |
| G11B 5/851 | (2006.01) |
| G11B 5/73 | (2006.01) |

(52) U.S. Cl.
CPC ............ *G11B 5/1278* (2013.01); *G11B 5/667* (2013.01); *G11B 5/732* (2013.01); *G11B 5/7325* (2013.01); *G11B 5/851* (2013.01)

(58) Field of Classification Search
CPC ........ G11B 5/732; G11B 5/7325; G11B 5/738
See application file for complete search history.

(56) References Cited

U.S. PATENT DOCUMENTS

| 5,866,227 A | 2/1999 | Chen et al. |
| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |
| 6,143,375 A | 11/2000 | Ross et al. |
| 6,145,849 A | 11/2000 | Bae et al. |
| 6,146,737 A | 11/2000 | Malhotra et al. |
| 6,149,696 A | 11/2000 | Jia |

(Continued)

FOREIGN PATENT DOCUMENTS

| JP | 2005353256 | 7/2005 |
| JP | 2009140562 | 6/2009 |

(Continued)

OTHER PUBLICATIONS

R.B. Goldfarb et al., "Units for Magnetic Properties," U.S. Department of Commerce, national Bureau of Standards, Boulder, CO 80303, Mar. 1985, 1 page.*

(Continued)

*Primary Examiner* — Holly Rickman
(74) *Attorney, Agent, or Firm* — Loza & Loza, LLP; Gabriel Fitch

(57) ABSTRACT

A data storage medium having a seed structure formed of a first seed layer comprising a nickel alloy NiY, where Y is an element selected from Al, B, Fe, Nb, W, and Co, and a second seed layer represented by NiWAX, where A is an element selected from Al, B, Fe, Nb, and Co, and X is either B, Si, Ti, Nb, V, Cr, Ru, or an oxide, with the second seed layer being disposed on the first seed layer; and a magnetic recording layer above the seed structure. In addition, a method for manufacturing a data storage medium containing the aforementioned seed structure is also disclosed.

26 Claims, 10 Drawing Sheets

200

| Carbon overcoat | 290 |
| Magnetic recording layers | 285 |
| Ru (high pressure) | 270-3 |
| Ru (low pressure) | 270-2 | 270
| Ru-alloy (low pressure) | 270-1 |
| NiA-X | 235 | 250
| Ni-alloy | 230 |
| AFC SUL | 225 |
| CrTi | 220 |
| Substrate | 205 |

(56) References Cited

U.S. PATENT DOCUMENTS

| | | |
|---|---|---|
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gornicki |
| 6,204,995 B1 | 3/2001 | Hokkyo et al. |
| 6,206,765 B1 | 3/2001 | Sanders et al. |
| 6,210,819 B1 | 4/2001 | Lal |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,815,098 B2 | 11/2004 | Matsunuma et al. |
| 6,855,232 B2 | 2/2005 | Jairson et al. |
| 6,857,937 B2 | 2/2005 | Bajorek |
| 6,884,520 B2 | 4/2005 | Oikawa et al. |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B2 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,498,092 B2 | 3/2009 | Berger et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,550,210 B2 | 6/2009 | Berger et al. |
| 7,569,490 B2 | 8/2009 | Staud |
| 7,572,526 B2 | 8/2009 | Berger et al. |
| 7,582,368 B2 | 9/2009 | Berger et al. |
| 7,588,843 B2 | 9/2009 | Iida et al. |
| 7,597,792 B2 | 10/2009 | Homola et al. |
| 7,597,973 B2 | 10/2009 | Ishiyama |
| 7,601,444 B2 | 10/2009 | Lai et al. |
| 7,608,193 B2 | 10/2009 | Wachenschwanz et al. |
| 7,632,087 B2 | 12/2009 | Homola |
| 7,638,210 B2 | 12/2009 | Berger et al. |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,687,157 B2 | 3/2010 | Berger et al. |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,824,785 B2 * | 11/2010 | Inamura .................. G11I 35/82 428/831.2 |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,989,096 B2 | 8/2011 | Berger et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,000,060 B2 | 8/2011 | Zhang et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,034,471 B2 | 10/2011 | Ishibashi et al. |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |

(56) References Cited

U.S. PATENT DOCUMENTS

| | | |
|---|---|---|
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,168,309 B2 | 5/2012 | Choe et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,329,321 B2 | 12/2012 | Takenoiri et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,390,956 B2 | 3/2013 | Tonooka et al. |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,507,115 B2 | 8/2013 | Arai et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 8,951,651 B2 | 2/2015 | Sakamoto |
| 8,956,741 B1 | 2/2015 | Li et al. |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0053795 A1 | 3/2005 | Kubota |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0227122 A1 | 10/2005 | Takahashi et al. |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0153419 A1 | 7/2007 | Arai et al. |
| 2007/0245909 A1 | 10/2007 | Homola |
| 2007/0292720 A1 | 12/2007 | Suess |
| 2008/0075845 A1 | 3/2008 | Sonobe et al. |
| 2008/0093760 A1 | 4/2008 | Harper et al. |
| 2008/0113221 A1 | 5/2008 | Hirayama et al. |
| 2008/0131735 A1 | 6/2008 | Das et al. |
| 2008/0268289 A1* | 10/2008 | Yamamoto ............ C23C 14/205 |
| | | 428/810 |
| 2009/0117408 A1 | 5/2009 | Umezawa et al. |
| 2009/0136784 A1 | 5/2009 | Suzuki et al. |
| 2009/0147403 A1 | 6/2009 | Araki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0296276 A1* | 12/2009 | Shimizu ................ G11B 5/667 |
| | | 360/125.03 |
| 2009/0311521 A1 | 12/2009 | Nikolov et al. |
| 2009/0311557 A1 | 12/2009 | Onoue et al. |
| 2010/0143752 A1 | 6/2010 | Ishibashi et al. |
| 2010/0149676 A1 | 6/2010 | Khizorev et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |

(56) References Cited

U.S. PATENT DOCUMENTS

| | | | |
|---|---|---|---|
| 2011/0223446 A1 | 9/2011 | Onoue et al. | |
| 2011/0242702 A1 | 10/2011 | Maeda | |
| 2011/0244119 A1 | 10/2011 | Umezawa et al. | |
| 2011/0299194 A1 | 12/2011 | Aniya et al. | |
| 2011/0311841 A1 | 12/2011 | Saito et al. | |
| 2012/0069466 A1 | 3/2012 | Okamoto et al. | |
| 2012/0070692 A1 | 3/2012 | Sato et al. | |
| 2012/0077060 A1 | 3/2012 | Ozawa | |
| 2012/0127599 A1 | 5/2012 | Shimokawa et al. | |
| 2012/0127601 A1 | 5/2012 | Suzuki et al. | |
| 2012/0129009 A1 | 5/2012 | Sato et al. | |
| 2012/0140359 A1 | 6/2012 | Tachibana | |
| 2012/0141833 A1 | 6/2012 | Umezawa et al. | |
| 2012/0141835 A1 | 6/2012 | Sakamoto | |
| 2012/0148875 A1 | 6/2012 | Hamakubo et al. | |
| 2012/0156523 A1 | 6/2012 | Seki et al. | |
| 2012/0164488 A1 | 6/2012 | Shin et al. | |
| 2012/0170152 A1 | 7/2012 | Sonobe et al. | |
| 2012/0171369 A1 | 7/2012 | Koike et al. | |
| 2012/0175243 A1 | 7/2012 | Fukuura et al. | |
| 2012/0189872 A1 | 7/2012 | Umezawa et al. | |
| 2012/0196049 A1 | 8/2012 | Azuma et al. | |
| 2012/0207919 A1 | 8/2012 | Sakamoto et al. | |
| 2012/0219827 A1 | 8/2012 | Kim et al. | |
| 2012/0225217 A1 | 9/2012 | Itoh et al. | |
| 2012/0251842 A1 | 10/2012 | Yuan et al. | |
| 2012/0251846 A1 | 10/2012 | Desai et al. | |
| 2012/0276417 A1 | 11/2012 | Shimokawa et al. | |
| 2012/0308722 A1 | 12/2012 | Suzuki et al. | |
| 2013/0040167 A1 | 2/2013 | Alagarsamy et al. | |
| 2013/0071694 A1 | 3/2013 | Srinivasan et al. | |
| 2013/0165029 A1 | 6/2013 | Sun et al. | |
| 2013/0175252 A1 | 7/2013 | Bourez | |
| 2013/0216865 A1 | 8/2013 | Yasumori et al. | |
| 2013/0230647 A1 | 9/2013 | Onoue et al. | |
| 2013/0235490 A1* | 9/2013 | Do | G11B 5/732 360/110 |
| 2013/0314815 A1 | 11/2013 | Yuan et al. | |
| 2014/0011054 A1 | 1/2014 | Suzuki | |
| 2014/0044992 A1 | 2/2014 | Onoue | |
| 2014/0050843 A1 | 2/2014 | Yi et al. | |
| 2014/0063656 A1 | 3/2014 | Hashimoto | |
| 2014/0151360 A1 | 6/2014 | Gregory et al. | |
| 2014/0234666 A1 | 8/2014 | Knigge et al. | |
| 2015/0262603 A1* | 9/2015 | Tonooka | G11B 5/732 428/828 |

FOREIGN PATENT DOCUMENTS

| | | |
|---|---|---|
| JP | 2008030951 | 8/2009 |
| JP | 2008123626 | 11/2009 |
| JP | 2009245484 | 5/2011 |
| JP | 2009289361 | 6/2011 |
| WO | 2008030199 | 3/2008 |
| WO | 2009044794 | 9/2009 |
| WO | 2010038448 | 8/2010 |

OTHER PUBLICATIONS

Japanese Office Action dated May 20, 2014 for related Japanese Application No. 2010-122589 7 pages.
Kumar Srinivasan, et al., U.S. Appl. No. 13/919,282, filed Jun. 17, 2013, 24 pages.
Mrugesh Desai, et al., U.S. Appl. No. 13/077,419, filed Mar. 31, 2011, 22 pages.
Richter, "The Physics of Perpendicular Records," Seagate Technology, Fremont, California, Dec. 2006.
Victora, et al., "Exchange Coupled Composite Media," IEEE, Conference-Related Paper, Aug. 15, 2007, pp. 1-9.
Kirby, et al., "Vertically Graded Anistropy in Co/Pd Multilayers," Physics Department, University of California, Davis, CA, pp. 1-16.
Suess, et al., "Optimizing Graded Perpendicular Media," University of California, Davis, CA, pp. 1-14.
Suess, et al., "Concepts of Magnetic 3D and Multilayer Recording," Vienna University of Technology, Vienna, Austria and the University of Sheffield, Sheffield, UK, pp. 1-34.
J Ariake et al., "Co-Pt-TiO2 Composite Film for Perpendicular Magnetic Recording Medium", IEEE Transactions on Magnetics, vol. 41, No. 10, pp. 3142-3144, Oct. 2005.
H S.Jung et al., "CoCrPtO-Based Granular Composite Perpendicular Recording Media", IEEE Transactions on Magnetics, vol. 43, No. 6, pp. 2088-2090, Jun. 2007.
S H.Park et al., "Effect of MgO and Al2O3 on the Microstructure and Magnetic Properties of CoCrPt-oxide Perpendicular Recording Media", Journal of Applied Physics, vol. 97, No. 10, pp. 106-1-3, 2005.
H S.Jung et al., "Effect of Oxygen Incorporation on Microstructure and Media Performance in CoCrPt-SiO2 Perpendicular Recording Media", IEEE Transactions on Magnetics, vol. 43, No. 2, pp. 615-620, Feb. 2007.
G. Choe et al., "Magnetic and Recording Characteristics of Reactively Sputtered CoPtCr-(Si-O, Ti-O, and Cr-O) Perpendicular Media", IEEE Transactions on Magnetics, vol. 42, No. 10, pp. 2327-2329, Oct. 2006.
Thomas P. Nolan et al., "Microstructure and Exchange Coupling of Segregated Oxide Perpendicular Recording Media", IEEE Transactions on Magnetics, vol. 43, No. 2, pp. 639-644, Feb. 2007.
H S. Jung et al., "Origin of Incoherent Magnetic Switching Behavior in CoCrPt-SiO2 Perpendicular Magnetic Recording Media", Applied Physics Letters, vol. 91, No. 212502, pp. 1-3, 2007.
M. Zheng et al., "Role of Oxygen Incorporation in Co-Cr-Pt-Si-O Perpendicular Magnetic Recording Media", IEEE Transactions on Magnetics, vol. 40, No. 4, pp. 2498-2500, Jul. 2004.
S. N. Piramanayagam et al., "Advanced Perpendicular Recording Media Structure With a Magnetic Intermediate Layer", Applied Physics Letters, vol. 88, No. 092501, pp. 1-3, 2006.
S. N. Piramanayagam et al., "Sub-6-nm grain size control in polycrystalline thin films using synthetic nucleation layer", Applied Physics Letters, vol. 91, No. 142508, pp. 1-4, 2007.
S. N. Piramanayagam et al., "CoRuCr-oxide intermediate layers for perpendicular magnetic recording media", Applied Physics Letters, vol. 105, No. 07B717, pp. 1-4 2009.
Gary C. Rauch et al., "The Effect of Cluster Size on Media Noise in Co-Ni-P Thin Films", IEEE Transactions on Magnetics, vol. 28, No. 5, pp. 3105-3107, Sep. 1992.
Atsushi Hashimoto et al., "Improvement of Magnetic Properties of Granular Perpendicular Recording Media by Using a FCC Nonmagnetic Intermediate Layer With Stacking Faults", Applied Physics Letters, vol. 89, No. 262508, pp. 1-3, 2006.
Atsushi Hashimoto et al., "Pseudo-HCP Nonmagnetic Intermediate Layer for Granular Media with High Perpendicular Magnetic Anisotropy", Journal of Physics D: Applied Physics, vol. 41, No. 012002, pp. 1-4, 2008.
K. W. Wierman et al., "RuxCr1-x/Ta Underlayer for Co-alloy Perpendicular Magnetic Recording", Journal of Applied Physics, vol. 91, No. 10, pp. 8031-8033, May 2002.
Hua Yuan et al., "Ru+Oxide Interlayer for Perpendicular Magnetic Recording Media", Journal of Applied Physics, vol. 103, 07F513, pp. 1-3, 2008.
Unoh Kwon et al., "Ru/Ru-Oxide Interlayers for CoCrPtO Perpendicular Recording Media", IEEE Transactions on Magnetics, vol. 41, No. 10, pp. 3193-3195, Oct. 2005.
"Effect of magnetic softness in a soft layer on media properties of hard/soft stacked composite perpendicular media," by Jung et al., from the Journal of Applied Physics 105, dated Nov. 13, 2008, 3 pages.
"TMR and Squeeze at Gigabit Areal Densities," by Arnett et al., from IEEE Transactions on Magnetics, vol. 28, No. 4, Jul. 1992, 4 pages.
Zhu, "Understand PMR Media," Data Storage Systems Center, Carnegie Mellon University, 2009, 16 pages.
Wang, et al., "Exchange Coupled Composite Media for Perpendiculat Magnetic Recording," IEEE Transactions on Magnetics, vol. 41, No. 10, pp. 3181-3186, Oct. 2005.

(56) References Cited

OTHER PUBLICATIONS

Hu, et al., "Exchange Coupling Assisted FePtC Perpendicular Recording Media," Applied Physics Letters 93, 072504, pp. 1-3, Aug. 2008.

Chen, et al., "High Coercivity L 10 FePt Films with Perpendicular Anistropy Deposited on Glass Substrate at Reduced Temperature," Applied Physics Letters 90, 042508 pp. 1-3, Jan. 2007.

Nakagawa, et al., "Effects of Thin Carbon Intermediate Layer on Magnetic and Structural Properties of Perpendicular Recording Media," Journal of Magnetism and Magnetic Materials, 235, pp. 73-77, 2001.

Victora, et al., "Composite media for perpendicular magnetic recording," IEEE Trans. Magn., vol. 41, 2005, pp. 537-542.

Suess, et al., "Optimization of exchange spring perpendicular recording media, " IEEE Trans. Magn., vol. 41, 2005, pp. 3166-3168.

Berger, et al., "Improved media performance in optimally coupled exchange spring layer media," Applied Physics Letters, vol. 93, 2008, pp. 122502-122502-3.

Zhang, et al., "Effects of exchange coupling between cap layer and oxide layer on the recording performance in perpendicular media," Journal of Applied Physics, vol. 105, 2009, pp. 07B710-07B710-3.

Choe, et al., "Control of Exchange Coupling Between Granular Oxide and Highly Exchange Coupled Cap Layers and the Effect on Perpendicular Magnetic Switching and Recording Characteristics," IEEE Trans. on Magnetics, vol. 45, No. 6, Jun. 2009, pp. 2694-2700.

Choe, et al., "Writeability Enhancement in Perpendicular Magnetic Multilayered Oxide Media for High Area Density Recording," IEEE Trans. on Magnetics, vol. 47, No. 1, Jan. 2011, pp. 55-62.

Nolan, et al., "Effect of Composite Designs on Writability and Thermal Stability of Perpendicular Recording Media," IEEE Trans. on Magnetics, vol. 47, No. 1, Jan. 2011, pp. 63-68.

Sonobe et al., "Thermally Stable CGC Perpendicular Recording Media With Pt-Rich CoPtCr and Thin Pt Layers", IEEE Trans. Magn., vol. 38, p. 2006 (2002).

\* cited by examiner

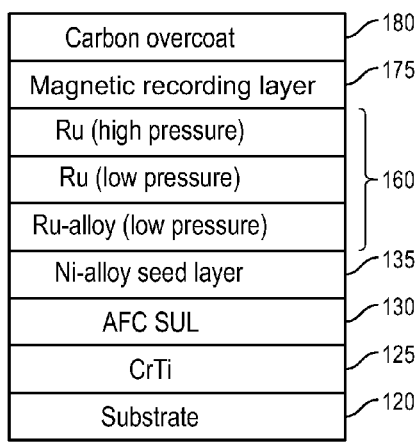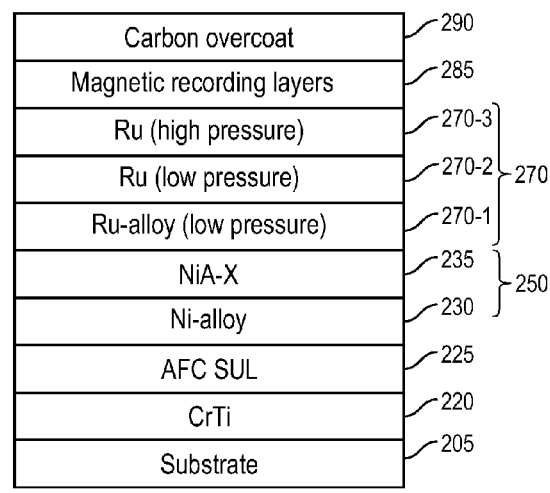
FIG. 1
(Prior Art)
FIG. 2

TABLE 1

|  |  | NiA layer Thickness | NiA-oxide Thickness | Seed Structure Thickness (nm) | Hc (Oe) | Hn (Oe) | S* | KuV/kT |
|---|---|---|---|---|---|---|---|---|
| Comparative Example | C1 | 5.7 | 0.0 | 5.7 | 4866 | -1538 | 0.29 | 94 |
|  | C2 | 7.0 | 0.0 | 7.0 | 5047 | -1835 | 0.33 | 104 |
|  | C3 | 8.4 | 0.0 | 8.4 | 5193 | -2058 | 0.36 | 116 |
| Example | E1 | 5.7 | 1.1 | 6.8 | 4882 | -1497 | 0.29 | 95 |
|  | E2 | 5.7 | 2.2 | 7.9 | 4838 | -1472 | 0.28 | 93 |
|  | E3 | 5.7 | 3.3 | 9.0 | 4830 | -1431 | 0.28 | 92 |
|  | E4 | 7.0 | 1.1 | 8.1 | 5057 | -1802 | 0.33 | 105 |
|  | E5 | 7.0 | 2.2 | 9.2 | 5044 | -1786 | 0.33 | 103 |
| Comparative Example | C4 | 0.0 | 5.4 | 5.4 | 3258 | -159 | 0.03 | -- |
|  | C5 | 0.0 | 8.9 | 8.9 | 3229 | -193 | 0.05 | -- |

FIG. 3

TABLE 2

|  |  | NiA layer Thickness | NiA-oxide Thickness | HP-Ru Layer Thickness (nm) | Hc (Oe) | Hn (Oe) | S* |
|---|---|---|---|---|---|---|---|
| Comparative Example | C6 | 4.8 | 0.0 | 8.2 | 5031 | -1563 | 0.28 |
|  | C7 | 4.8 | 0.0 | 9.3 | 5005 | -1563 | 0.27 |
|  | C8 | 4.8 | 0.0 | 10.3 | 5022 | -1530 | 0.27 |
|  | C9 | 4.8 | 0.0 | 11.4 | 5013 | -1497 | 0.26 |
| Example | E6 | 4.8 | 1.1 | 7.1 | 5026 | -1596 | 0.28 |
|  | E7 | 4.8 | 1.1 | 8.2 | 5012 | -1547 | 0.27 |
|  | E8 | 4.8 | 1.1 | 9.3 | 5015 | -1522 | 0.27 |
|  | E9 | 4.8 | 1.1 | 10.3 | 4983 | -1472 | 0.26 |
|  | E10 | 4.8 | 1.1 | 11.4 | 4992 | -1480 | 0.26 |

FIG. 8

TABLE 3

| Sample | NiA layer Thickness | NiA-oxide Thickness | HP-Ru Layer Thickness (nm) | MWW 2T (uln) | MTW 2T (uln) | OW2 (db) | SNR (db) |
|---|---|---|---|---|---|---|---|
| C8 | 4.8 | 0.0 | 10.3 | 2.38 | 2.91 | 42.4 | 12.7 |
| E8 | 4.8 | 1.1 | 9.3 | 2.40 | 2.89 | 43.8 | 12.7 |

FIG. 10

SEED STRUCTURE FOR PERPENDICULAR MAGNETIC RECORDING MEDIA

RELATED APPLICATIONS

This application is related to "PERPENDICULAR MAGNETIC RECORDING DISK," Ser. No. 13/149,659 filed on May 31, 2011 for Kazuaki Sakamoto and to "PERPENDICULAR RECORDING MEDIA WITH AN EXCHANGE CONTROL MATERIAL LAYER FOR WRITABILITY ENHANCEMENT," Ser. No. 13/919,282 filed on Jun. 17, 2013 for Kumar Srinivasan. Both of the aforementioned patent applications are currently pending and have a common assignee with the present application.

BACKGROUND

Perpendicular magnetic recording (PMR) technology is incorporated in magnetic recording media to increase areal density. Generally, PMR media includes four functional building blocks: a soft magnetic underlayer (SUL), a seed layer, an intermediate layer and a magnetic recording layer (RL). An example of conventional PMR media is shown in FIG. 1. The medium comprises a stack of layers on a nonmagnetic substrate 120. Between the SUL 130 and the substrate 120 is an adhesion layer 125. Upon the SUL 130 is a single seed layer of nickel alloy 135. Overlying seed layer 135 is a series of intermediate layers 160. On top of the intermediate layers 160 is a magnetic recording layer 175 which is protected by a carbon overcoat 180.

Reduction of grain size distribution in the magnetic recording layer is important to obtain a small switching field distribution (SFD), which is necessary to improve signal-to-noise ratios (SNR) of the PMR media. Although nickel alloy seed layers are extensively used in current PMR media, such alloys have been found to develop a coarse grain structure. Due to their coarse grain structure, nickel alloy seed layers tend to produce large magnetic clusters and a wide grain size distribution in magnetic recording layers.

There thus remains a need for controlling the grain structure of the seed layer while maintaining its texture to achieve a narrow grain size distribution and to improve recording performance of PMR media.

BRIEF DESCRIPTION OF THE DRAWINGS

FIG. 1 illustrates a cross sectional view of a conventional PMR medium.

FIG. 2 illustrates a cross sectional view of a PMR medium in accordance with one embodiment.

FIG. 3 illustrates a table that compares variation of magnetic characteristics with respect to various PMR media samples.

FIG. 8 illustrates a table that compares variation of magnetic characteristics with respect to various PMR media samples.

FIG. 10 illustrates a comparison of overwrite characteristics for media containing a seed structure with oxide in accordance with one embodiment compared to a control sample that contains a single seed layer.

DETAILED DESCRIPTION

Figure 4:
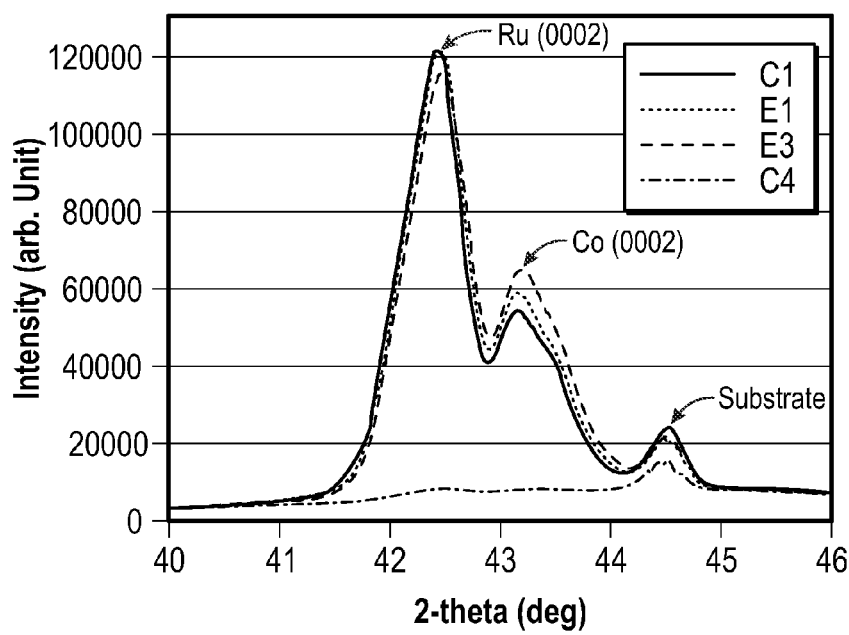
FIG. 4 illustrates XRD data for seed layers of various PMR media samples.

FIG. 2 is a simplified diagram of a perpendicular magnetic recording (PMR) medium 200 in accordance with one embodiment. The PMR medium 200 includes a novel bi-layer seed structure 250 disposed between SUL 225 and an intermediate layer (interlayer) 270. It should be appreciated that the layers discussed herein may be formed on both sides of a substrate to form a double-sided magnetic recording disk. However, only the layers on a single side of substrate are shown for ease of illustration. Alternatively, a single-sided perpendicular magnetic recording disk may be formed.

The PMR medium 200 includes a substrate 205 upon which is disposed an adhesion layer 220. Above the adhesion layer 220 is a soft under layer (SUL) 225. Above the SUL 225 is a first seed layer 230. A second seed layer 235 is provided above first seed layer 230. The first seed layer 230 and the second seed layer 235 together form a seed structure 250. Above the second seed layer 235 is an interlayer 270. One or more magnetic recording layers 285 (hereinafter, recording layer 285) is disposed upon the interlayer 270. Recording layer 285 is protected with an overcoat 290, which may comprise a carbon layer such as a diamond-like coating (DLC).

The substrate 205 in FIG. 2 may be composed of glass, aluminum or aluminum alloy. Suitable glass materials for the substrate include aluminosilicate glass, soda lime glass, soda aluminosilicate glass, aluminoborosilicate glass, borosilicate glass, quartz glass, chain silicate glass, and glass ceramic such as crystallized glass.

Layers from the adhesion layer 220 to the recording layer 285 are sequentially deposited on substrate 205 using a sputtering apparatus known to those skilled in the art. One suitable sputtering apparatus is a DC magnetron. As an example, the layers above substrate 205 may be sputtered in an Ar (argon) atmosphere. In other embodiments, both argon and oxygen gas may be used in a sputter deposition process to form PMR medium 200.

The carbon overcoat 290 can be deposited by a CVD method. A lubricating layer (not shown) may be formed on the PMR medium 200 by a dip coating method. In some embodiments, an in-line deposition method may be performed to enhance productivity. The composition of each layer will be described in further detail below.

The adhesion layer 220 is provided on substrate 205 to strengthen the adhesion between the SUL 225 and substrate 205. Adhesion layer 220 may be an amorphous alloy film, such as a CrTi-base amorphous alloy, a CoW-base amorphous alloy, a CrW-base amorphous alloy, a CrTa-base amorphous alloy, or a CrNb-base amorphous alloy. The adhesion layer 220 may be a single layer, or a laminate of multiple layers. In several embodiments, adhesion layer 220 can have a film thickness ranging from 2 nm to 20 nm.

FIG. 2 illustrates an anti-ferromagnetically coupled (AFC) SUL 225 on top of adhesion layer 220. SUL 225 provides a flux return path for the magnetic field from the recording head. The SUL 225 is formed of a soft magnetic material, such as a cobalt alloy or an iron alloy. Examples of appropriate materials for the SUL include FeCoCrB, FeCoTaZr, FeCoNiTaZr, and NiFe-base alloys.

Above SUL 225 is disposed a seed structure 250. Seed structure 250 is composed of two distinct seed layers 230, 235. In some embodiments, first seed layer 230 may be disposed directly on SUL 225. However, in other embodiments, an intervening layer may be provided between SUL 225 and first seed layer 230. The purpose of seed structure 250 is to improve magnetic recording performance in PMR medium 200. Seed structure 250 maintains (111) orientation of the face-centered cubic or fcc nickel alloy grains to promote a hexagonal close-packed or hcp (0002) texture for interlayer 270 and recording layer 285. Seed structure 250 also provides a template for optimum grain size properties. As a result, in several embodiments, seed structure 250 contributes to producing a smaller grain size distribution in medium 200.

Interlayer 270 is disposed directly on the upper surface of seed structure 250. The interlayer 270 decouples SUL 225 from recording layer 285. A first film of ruthenium or ruthenium alloy (hereinafter referred to as ruthenium-containing interlayer) 270-1 is deposited on seed structure 250 at low pressure. Then a second ruthenium-containing interlayer 270-2 may be deposited at low pressure on interlayer 270-1. Directly on interlayer 270-2, another ruthenium-containing interlayer 270-3 may be deposited. However, the ruthenium-containing interlayer 270-3 is deposited at high pressure. The high pressure ruthenium (HPRu) interlayer 270-3 may have a thickness of 3 nm to 12 nm. Next, a recording layer 285 is provided on interlayer 270-3.

More details regarding the novel seed structure 250 will now be provided. In several embodiments, seed structure 250 ranges in thickness between 3 nm to 13 nm. In one embodiment, first seed layer 230 is a nickel alloy, NiA, and the second seed layer 235 is a nickel alloy, NiAX or NiWAX, disposed on first seed layer 230. In seed layer 230, A is selected from a high-melting point element such as aluminum (Al), boron (B), iron (Fe), niobium (Nb), tungsten (W), and cobalt (Co). In other embodiments, A may be a combination of two or more elements of Al, B, Co, Fe, Nb, W. One example of the first seed layer can be NiWAlFe.

In certain embodiments, the first seed layer has a composition represented by $Ni_{1-p}A_p$ where p is between 0.10-0.50. The thickness of first seed layer 230 ranges from 3 nm to 10 nm. First seed layer 230 functions to impart an fcc (111) texture to the second seed layer 235. In several embodiments, first seed layer 230 may have a saturation induction greater than 5 kilo-gauss (5 kG).

Compared to seed layer 230, second seed layer 235 may have a more diverse range of compositions. In some embodiments, second seed layer 235 has a composition represented by $Ni_{1-(m+n)}A_mX_n$, where A is one or more elements selected from aluminum (Al), boron (B), iron (Fe), niobium (Nb), tungsten (W), and cobalt (Co), and X is an oxide. In accordance with the above formula, m is a value between 0.10-0.50, n is a value between 0.01-0.10, and nickel (Ni) comprises the balance of the seed layer 235. Thus the ratio of element A in seed layer 235 may be greater than X. In alternative embodiments, X in second seed layer 235 may be an element from boron (B), silicon (Si), titanium (Ti), niobium (Nb), vanadium (V), chromium (Cr) and ruthenium (Ru). When X is an oxide, X may be either a metal oxide, metalloid oxide or a combination of oxide materials, wherein the oxide material is selected from an oxide of titanium, silicon, chromium, aluminum, zirconium, tantalum, niobium, vanadium, magnesium, manganese, tungsten, hafnium or boron. Suitable oxides for seed layer 235 include, but are not limited to, TiO2, SiO2, CrO2, Cr2O3, Al2O3, ZrO2, Ta2O5, Nb2O5, V2O5, MgO, Mg2B2O5, MnO, WO3, HfO2, and B2O3. In some embodiments, X in $Ni_{1-(m+n)}A_mX_n$ may be a combination of at least two or more oxide materials selected from the group of TiO2, SiO2, CrO2, Cr2O3, Al2O3, ZrO2, Ta2O5, Nb2O5, V2O5, MgO, Mg2B2O5, MnO, WO3, HfO2, or B2O3. Seed structure 250 comprises a second seed layer 235 being disposed on top of first seed layer 230.

In other embodiments, second seed layer 235 may include an oxide selected from the group consisting of TiO2, SiO2, CrO2, Cr2O3, Al2O3, ZrO2, Ta2O5, Nb2O5, V2O5, MgO, Mg2B2O5, MnO, WO3, HfO2, or B2O3. Yet in other embodiments, second seed layer 235 may include two or more compounds selected from the group consisting of TiO2, SiO2, CrO2, Cr2O3, Al2O3, ZrO2, Ta2O5, Nb2O5, V2O5, MgO, Mg2B2O5, MnO, WO3, HfO2, or B2O3. By including the seed structure 250 in a PMR media, a thinner interlayer (270-3) was possible in certain embodiments.

Yet in other embodiments, second seed layer 235 may comprise a nickel alloy NiWAX, where W represents tungsten and A may be an element selected from aluminum (Al), boron (B), iron (Fe), niobium (Nb), and cobalt (Co), and X is either boron (B), silicon (Si), titanium (Ti), niobium (Nb), vanadium (V), chromium (Cr), ruthenium (Ru), or an oxide. Further, in several embodiments, second seed layer 235 may be further represented by $Ni_{1-(l+h+k)}W_lA_hX_k$, where l is a value between 0.01-0.10, h is a value between 0.10-0.40, and k is a value between 0.01-0.10. In embodiments where X is an oxide, the oxide may be selected from the group consisting of TiO2, SiO2, CrO2, Cr2O3, Al2O3, ZrO2, Ta2O5, Nb2O5, V2O5, MgO, Mg2B2O5, MnO, WO3, HfO2, or B2O3. In other embodiments, second seed layer 235 may contain at least two oxides from the group consisting of TiO2, SiO2, CrO2, Cr2O3, Al2O3, ZrO2, Ta2O5, Nb2O5, V2O5, MgO, Mg2B2O5, MnO, WO3, HfO2, or B2O3.

In order to evaluate the proposed media structure, PMR media samples based on the conventional design (FIG. 1) and the seed structure 250 (FIG. 2) were compared. FIG. 3 provides a table (Table 1) summarizing data for various samples having different seed layer compositions and different thicknesses. Three different types of samples were analyzed: 1) media with a single NiA seed layer (samples C1-C3); 2) media with a single nickel alloy oxide (NiA-oxide) seed layer (samples C4-C5); and 3) media with two distinct nickel alloy layers (samples E1-E5). Samples E1-E5 contain a first seed layer of NiA (230) and a second seed layer 235 (NiA-oxide). The samples were evaluated for their coercivity Hc, coercivity squareness S*, nucleation field Hn and thermal stability KuV/kT (Ku: crystalline magnetic anisotropic constant, V: magnetic cluster volume, k: Boltzmann constant, and T: absolute temperature). In Table 1, samples C1-C3 correspond to conventional medium 100 and were prepared with a single nickel alloy seed layer. Sample C1 included a seed layer of 5.7 nm thickness. Sample C2 contained a seed layer having a thickness of 7.0 nm, and sample C3 contained a seed layer having a thickness of 8.4 nm. Magnetic properties of samples C1-C3 varied significantly as their respective seed layers increased in thickness as shown in FIG. 3. Thus, Hc for C1-C3 varied from 4966 Oe to 5193 Oe, Hn varied from −1538 to −2058 and KuV/kT increased from 94 to 116. The inventors believe that the changes in magnetic properties may have been caused by an increase in grain size of the magnetic recording layer as a result of an increase in the seed layer thickness.

FIG. 3 shows a different trend for samples C4 and C5 which replaced layer 135 in FIG. 1 with an oxide seed layer. For instance, as the NiA-oxide seed layer became thicker, C4 and C5 exhibited significantly smaller changes in magnetic properties than C1-C3 for comparable increases in the seed layer thickness. In general, samples C4 and C5 show lower Hc, |Hn| and S* than samples C1-C3 due to poor hcp (0002) texture of the recording layer 285 as described in further detail below.

Also shown in FIG. 3 is data for samples E1 to E5, which correspond to designs that include seed structure 250 comprising first seed layer 230 and second seed layer 235. Samples E1-E5 included a NiA-2SiO2-2TiO2 (NiA-oxide) layer deposited onto a nickel alloy (NiA) seed layer. To determine the extent to which variation of thickness contributed to differences in magnetic properties, first seed layer 230 was maintained at 5.7 nm thickness in E1 to E3, while the thickness of second seed layer (NiA-oxide) 235 was varied. Thus, in samples E1 to E3, thickness of seed layer 235 was increased from 1.1 nm to 3.3 nm. The magnetic properties of the samples were measured at room temperature using a polar-Kerr magnetometer. The results for seed structures 250 are further discussed below.

Sample E1 had a seed structure 250 with an overall thickness of 6.8 nm, with the first seed layer 230 comprising 5.7 nm of the total structure and second seed layer 235 comprising the balance or 1.1 nm. From Table 1, sample E1 is shown to have an Hc of 4882 Oe, S* of 0.29, Hn of −1497 Oe and KuV/kT of 95. The composition of seed structures in samples E2 and E3 paralleled the composition of E1. However, sample E2 contained a second seed layer that was twice the thickness of the equivalent layer in E1, whereas the second seed layer in E3 was three times the thickness of the equivalent layer in E1. Despite double and tripling the thickness of seed layer 235, samples E2 and E3 closely resembled the Hc and KuV/kT values of sample E1. To further assess the advantage of seed structure 250, additional samples (E4 and E5) were evaluated using a first seed layer 230 with a 7 nm thickness, and a second seed layer with thicknesses 1.1 and 2.2 nm. As with samples E1-E3, the magnetic properties observed in samples E4 and E5 remained substantially stable with the addition of second seed layer 235 compared to the results for sample C2. In addition, it was determined that in certain embodiments, incorporating NiA-oxide into seed structure 250 may provide a means to obtain narrow grain size distributions for recording layer 285.

To confirm the results of FIG. 3, sample texture was characterized by performing X-ray diffraction (XRD) θ-2θ scans from 2θ=40° to 46° and rocking curve scans of the Ru (0002) and Co (0002) peaks using an X-ray diffractometer. FIG. 4 illustrates a XRD θ-2θ scan of media design structures with and without a second seed layer 235 based on nickel alloy oxide. Specifically, the XRD θ-2θ scans of conventional media (C1 and C4) were compared to media comprising a seed structure 250 (E1 and E3). The E1 sample corresponds to a PMR media that contains a first NiA seed layer that is 5.7 nm thick and a second NiA-oxide seed layer that is 1.1 nm thick. Also shown in FIG. 4 is E3 which has a NiA layer of 5.7 nm thickness and a NiA-oxide layer of 3.3 nm thickness.

For comparison, comparative examples, C1 and C4, having a single seed layer are also shown in FIG. 4. C1 corresponds to a PMR media having seed layers composed of a non-oxide nickel alloy. From FIG. 4, it is observed that C1 has a weaker cobalt peak than either the spectra for E1 and E3 above. C4 is a PMR media with a single seed layer composed of nickel oxide alloy. The spectra for C4 lacks Ru and Co and thus is the least suitable PMR media of the samples analyzed for controlling texture and morphology of magnetic recording layers.

Figure 5:
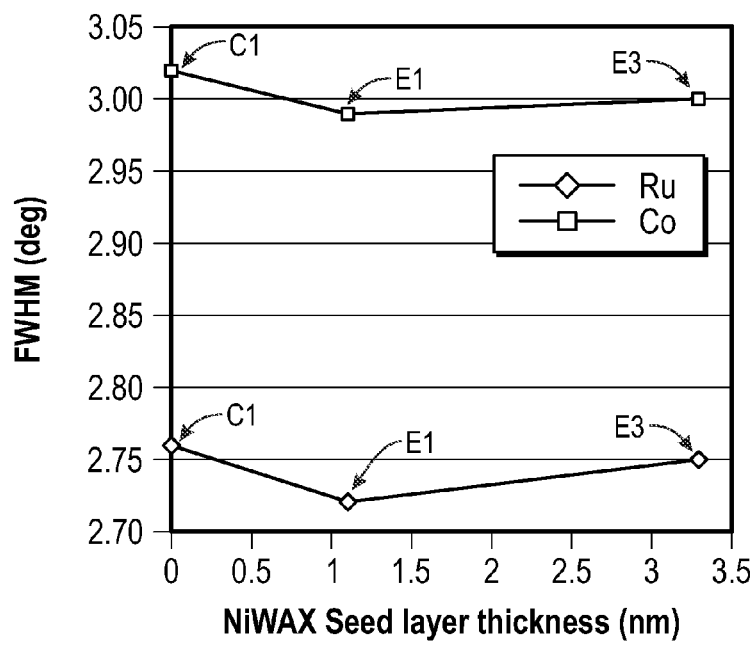
FIG. 5 illustrates full-width half maximum (FWHM) data for Ru and Co peaks as a function of a nickel alloy seed layer in accordance with one embodiment.

The effects of incorporating a NiA-2SiO2-2TiO2 seed layer on the texture of structure 200 were evaluated by measuring the full-width-half-maximum (FWHM) of interlayer 270. FIG. 5 illustrates the results of a FWHM measured by rocking curve scans of a medium containing the novel seed structure and a ruthenium cobalt alloy for the interlayer. The FWHM of both Ru and Co peaks of E1 and E3 are nominally the same as that of sample C1 without the second NiA-oxide seed layer, and remained unchanged as the thickness of the nickel alloy oxide layer increased from 1.1 nm to 3.3 nm. As shown in FIG. 5, the FWHM of both Ru and Co peaks of E1 and E3 remain unchanged as the thickness of the NiA-2SiO2-2TiO2 layer was increased up to 3.3 nm, confirming that hcp (0002) texture of interlayers 270-1 to 270-3 and recording layer 285 are not adversely affected by the insertion of second seed layer 235 into the PMR medium. These results demonstrate the advantages of including seed layer 235 in PMR media, such as offering an opportunity to create oxide grain boundary phase in seed structure 250 and improving the control of grain size and grain size distribution in media 200.

FIGS. 6A-6D summarize the magnetic properties at different thickness values for media 100 and media 200 samples. In FIGS. 6A-6D, second seed layer 235 in E1-E3 was formed of NiA-2SiO2-2TiO2 (NiA-oxide), although other types of oxide materials other than silicon oxide and titanium oxide are expected to yield similar results. The seed layer in samples C1-C3 corresponded to a nickel alloy NiA. FIGS. 6A-6D illustrate comparisons of media performance in magnetic and spin stand measurements of media structures shown in FIG. 1 and FIG. 2. Three samples (E1-E3) with seed structure 250 were compared to three samples of conventional media (C1-C3) in FIGS. 6A-6D. The seed layer of media 100 was maintained at a constant thickness, while the seed structure 250 of media 200 was gradually increased in overall thickness for this evaluation. For this comparative study, samples including seed structure 250 only varied the thickness of top seed layer 235, while the lower seed layer 230 was maintained at a thickness of 5.7 nm.

Figure 6A:
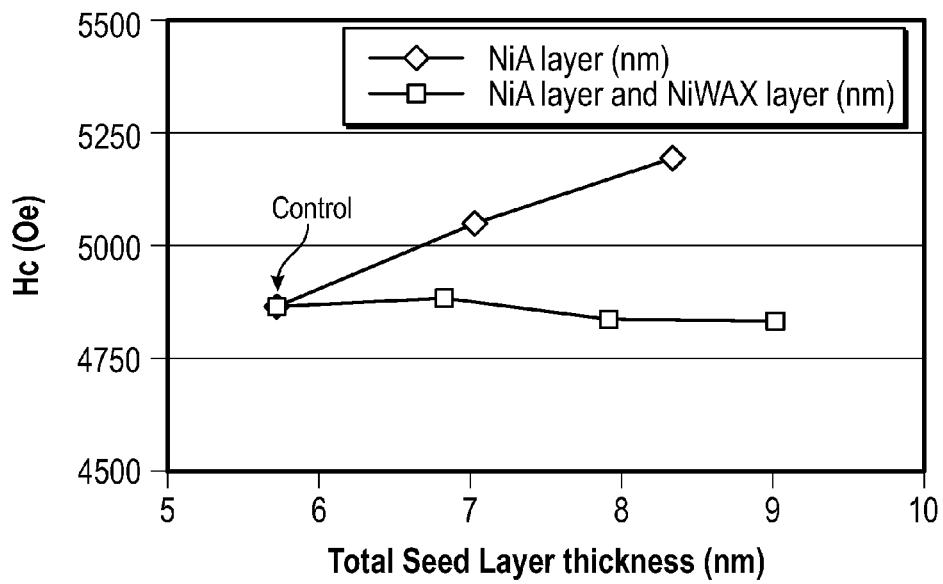
FIGS. 6A-6D illustrate magnetic properties of a bi-layer seed structure as a function of total seed layer thickness compared to a conventional PMR medium.

FIG. 6A illustrates the coercivity of structures depicted in FIGS. 1 and 2. The coercivity Hc is plotted as a function of the total seed layer thickness of various seed structures for media 100 and media 200. FIG. 6A illustrates that Hc remained stable for media 200 containing seed structure 250 with NiWAX and NiA-oxide seed layers (E1-E3). Specifically, samples E1-E3 exhibited stable coercivity (Hc) value seven as seed structure 250 increased in overall thickness. The coercivity of three comparative examples (C1-C3) were also measured and plotted in FIG. 6A. Samples C1-C3 contained a single seed layer formed of a nickel alloy. Hc of samples C1-C3 increased from 4750 Oe to 5200 Oe as the thickness of seed layer 135 increased. Thus, as opposed to the curve for samples E1-E3, samples C1-C3 showed a notably steep upward slope as the seed layer thickness increased.

Figure 6B:
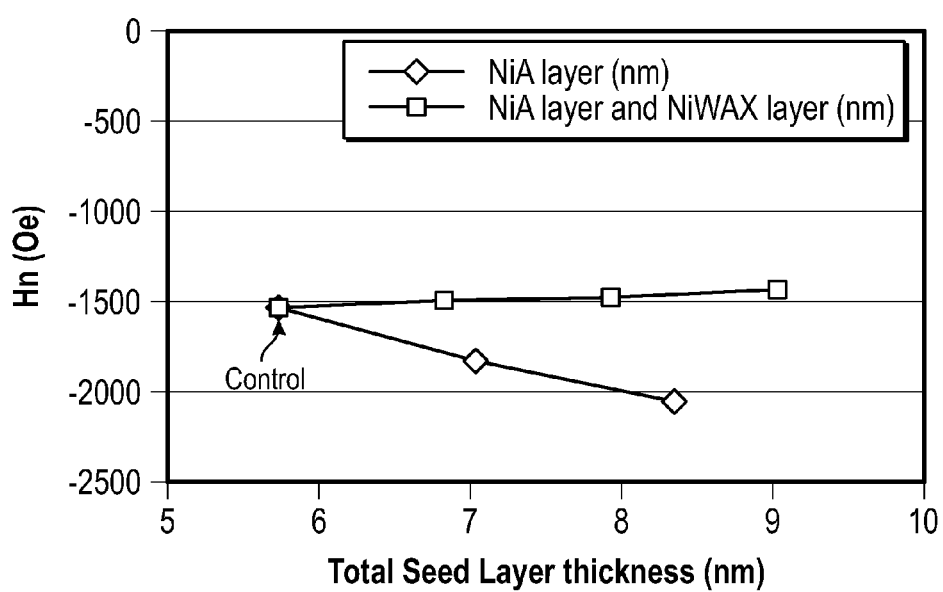

FIG. 6B is a plot of the nucleation field (Hn) versus the thickness of the same media evaluated in FIG. 6A. Samples E1-E3 differed in thickness by between 1 nm-2 nm from each other. Yet, all three of E1-E3 displayed substantially similar nucleation fields as can be seen in FIG. 6B. By contrast, samples C1-C3 experienced a significant decrease in Hnas their seed layer increased in thickness.

Figure 6C:
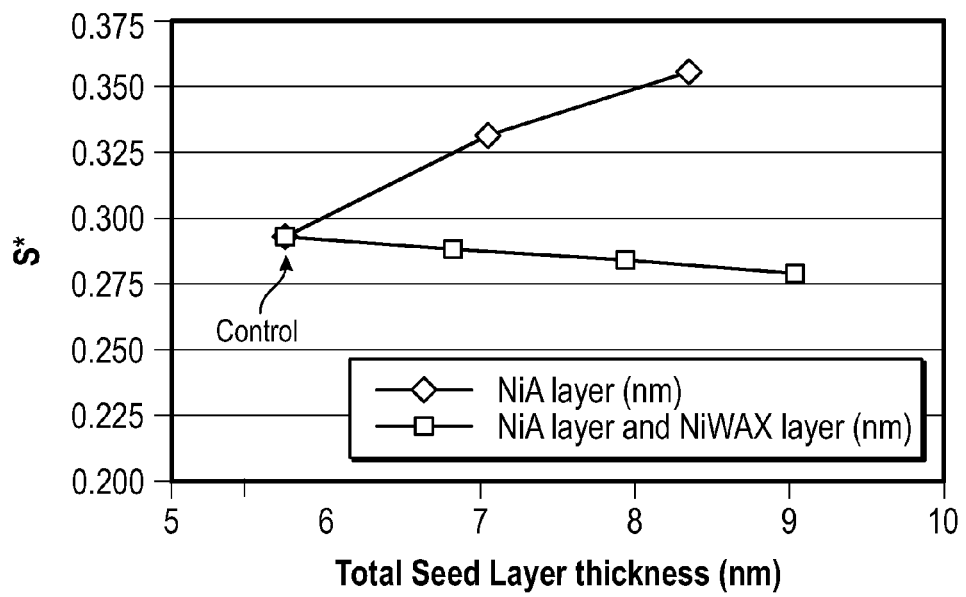

FIG. 6C is a plot of squareness S* versus seed structure thickness. As the seed layer of media 100 became thicker, a sharp change in squareness was observed. By contrast, media 200 exhibited relatively stable squareness as the seed structure 250 changed in thickness from 5.7 nm to 9 nm.

Figure 6D:
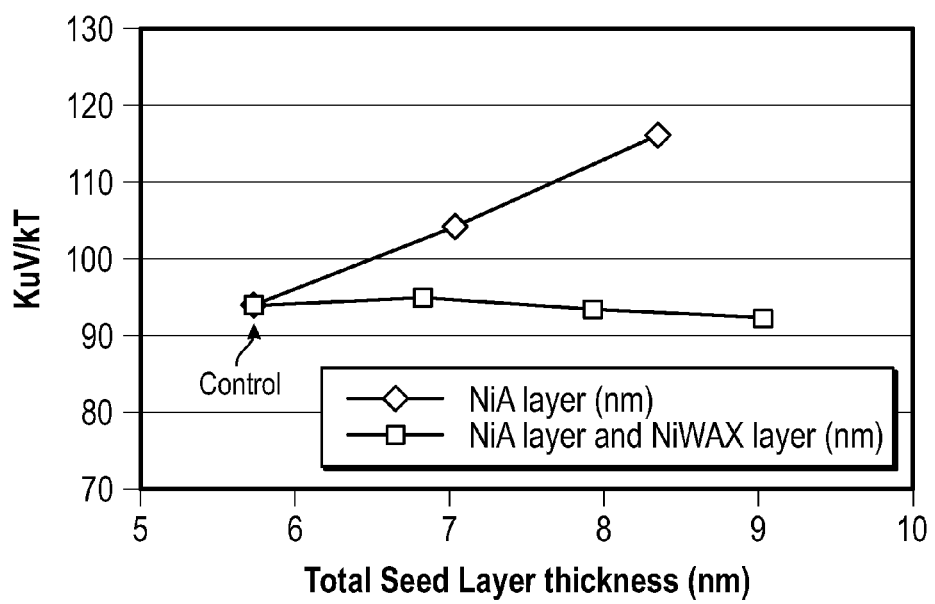

FIG. 6D is a plot of KuV/kT versus seed structure thickness. Again, the magnetic property measured for samples E1-E3 remained substantially stable despite an increase in thickness of seed structure 250. However, samples corresponding to media 100 (C1-C3)—containing solely a single nickel alloy seed layer—demonstrated a rapid rise in the change of KuV/kT as their respective seed layers increased in thickness.

Based on FIGS. 6A-6D, it is evident that Hc, S*, |Hn| and KuV/kT all increase significantly for samples C1-C3, which include solely a NiA seed layer. This can be attributed to the fact that the NiA grain size generally increases with thickness, resulting in larger magnetic grains in the recording layers. In contrast, samples E1-E3, which contain NiA-oxide as the upper seed layer, show much smaller changes in all magnetic properties measured. The behavior of samples E1-E3 illustrated in FIGS. 6A-6D suggests that the grain size of recording layer 285 for these samples remains relatively unchanged regardless of the thickness of the second seed layer 235. This implies that grain growth in the NiA-oxide layer 235 is severely hindered compared to the NiA seed layer of conventional media 100 (C1-C3), which may be due to the presence of grain boundary oxide phase of seed layer 235 in samples E1-E3.

Figure 7A:
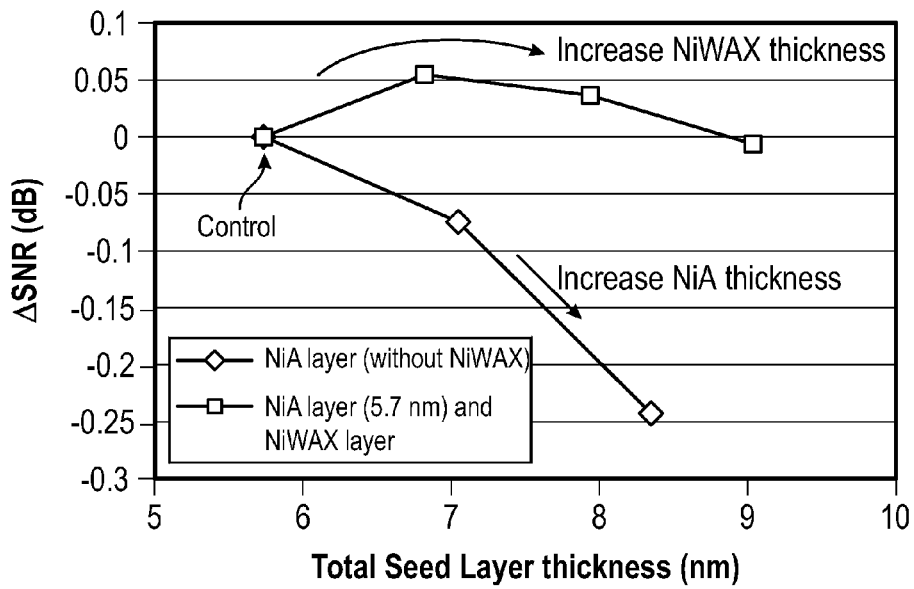
FIG. 7A illustrates signal to noise ratios for a seed structure in accordance with an embodiment as compared to a conventional PMR medium.
Figure 7B:
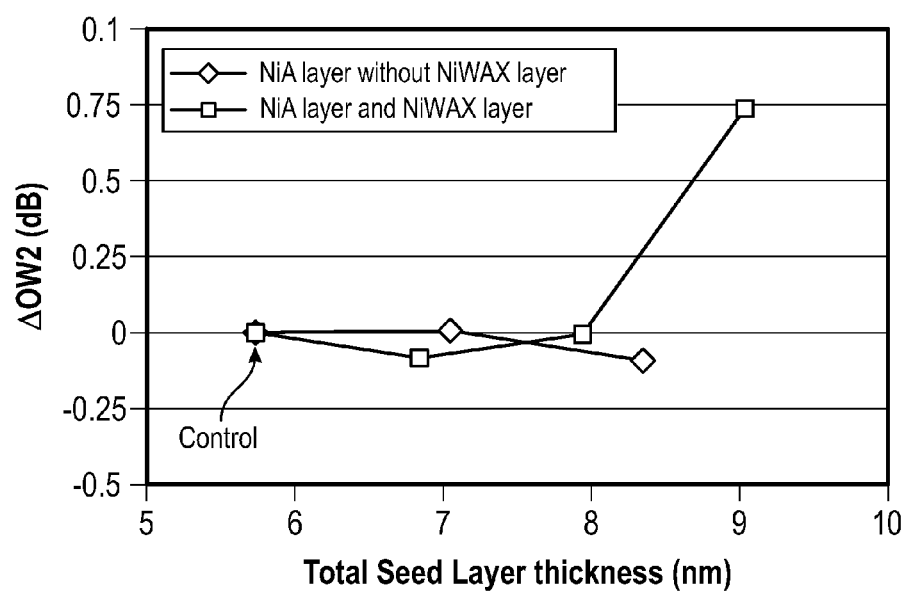
FIG. 7B illustrates reverse overwrite levels for a seed structure in accordance with an embodiment as compared to reverse overwrite levels demonstrated by a seed structure that contains a single seed layer.

The change in several magnetic recording performance parameters relative to the control sample (C1 in FIG. 3), including ΔSNR (i.e. change in signal-to-noise relative to the control sample C1) and ΔOW2 (change in reverse overwrite relative to the control sample C1), are plotted in FIGS. 7A and 7B as a function of the total seed layer thickness for different seed structures. In certain embodiments, the insertion of a second seed layer, such as NiA-oxide, resulted in better recording performance over the conventional media 100. For the samples without NiA-oxide, increasing the NiA seed layer thickness significantly reduced SNR. By comparison, samples containing a NiWAX show matching ΔSNR and OW2 compared to the control sample (C1) as seed layer 230 increased in thickness. FIG. 7A is a plot of ΔSNR versus seed structure thickness for samples with Ni oxide (FIG. 2) and without Ni oxide (FIG. 1). ΔSNR increased to 0.05 dB for samples containing seed structure 250 and the ΔSNR remained higher than conventional PMR media 100 that omits a second nickel alloy seed layer. This indicates the potential benefits of incorporating NiWAX as part of the seed structure to provide a better template for improving recording performance.

FIG. 7B is a plot of overwrite ΔOW2 versus seed structure thickness. Samples containing HP-Ru interlayer 270-3 with a thickness between 6 nm and 8 nm, exhibited a slightly higher OW2 when compared to conventional PMR medium 100.

Another investigation of a seed structure is shown in Table 2 of FIG. 8. In Table 2, second seed layer 235 comprised a NiWAX layer, where X includes more than one oxide material. The types of oxides suitable for the NiWAX seed layer include either a metal oxide, metalloid oxide or a combination of oxide materials. In particular, oxide materials for second seed layer 235 may be selected from an oxide of titanium, silicon, chromium, aluminum, zirconium, tantalum, niobium, vanadium, magnesium, manganese, tungsten, hafnium or boron. Specific oxide materials for seed layer 235 may thus include, but are not limited to, $TiO_2$, $SiO_2$, $CrO_2$, $Cr_2O_3$, $Al_2O_3$, $ZrO_2$, $Ta_2O_5$, $Nb_2O_5$, $V_2O_5$, MgO, $Mg_2B_2O_5$, MnO, $WO_3$, $HfO_2$, and $B_2O_3$. In other embodiments, X in NiWAX may be a combination of at least two or more oxide materials selected from the group of $TiO_2$, $SiO_2$, $CrO_2$, $Cr_2O_3$, $Al_2O_3$, $ZrO_2$, $Ta_2O_5$, $Nb_2O_5$, $V_2O_5$, MgO, $Mg_2B_2O_5$, MnO, $WO_3$, $HfO_2$, or $B_2O_3$. In Table 2, the thickness of the seed layer in C6-C9 was maintained at 4.8 nm, while the thickness of the HP Ru interlayer was varied. However, the coercivity Hc and squareness S* for C6-C9 remained relatively unchanged as the thickness of HP-Ru interlayer 270-3 was increased. On the other hand, the nucleation field Hn for samples C6-C9 declined once the HPRu interlayer increased above 9.0 nm.

As shown in FIG. 8, samples E6-E1° correspond to samples that contain the same seed structure—a 4.8 nm NiA layer and a 1.1 nm NiA-oxide layer. However, samples E6-E10 differed by the dimension of their HPRu interlayer. Each of samples E6-E10 utilized an HPRu interlayer of successively increasing thickness. Thus, E6 had a 7.1 nm HPRu interlayer; E7, an 8.2 HPRu interlayer; E8, a 9.3 HPRu interlayer; E9, a 10.3 nm HPRu interlayer; and E10 an 11.4 nm HPRu interlayer. With increasingly thicker HPRu interlayers, the nucleation field in samples E6-E9 decreased in magnitude.

Figure 9A:
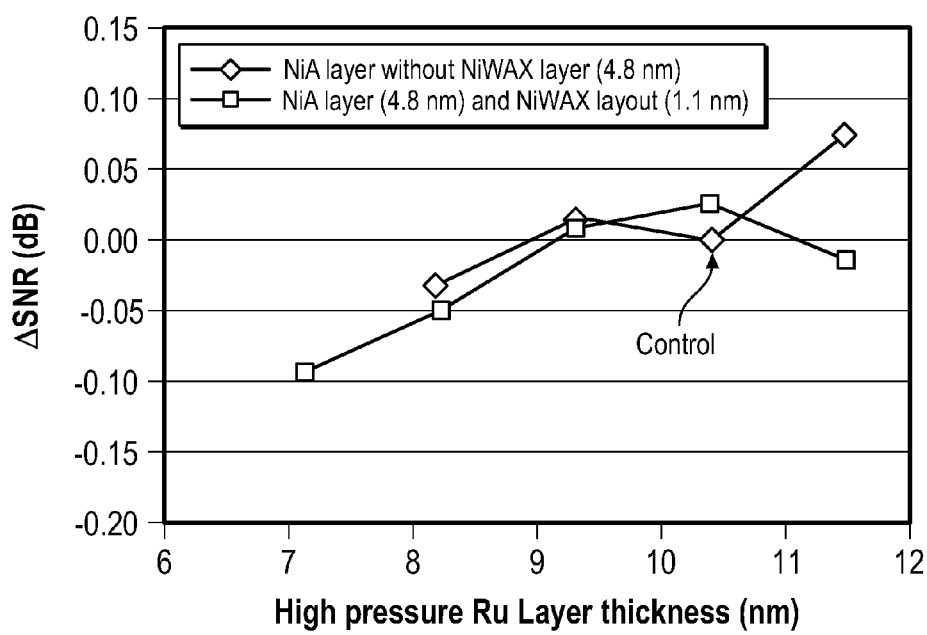
FIG. 9A compares signal to noise ratios for the media of FIG. 1 and FIG. 2 as a function of high pressure intermediate layer thickness.
Figure 9B:
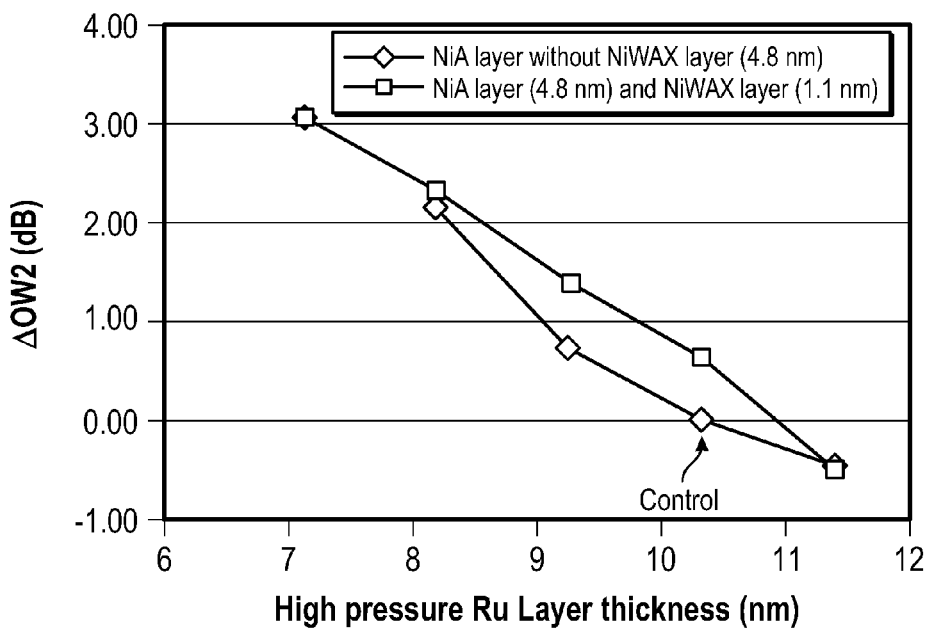
FIG. 9B compares overwrite levels for the media of FIG. 1 and FIG. 2 as a function of high pressure intermediate layer thickness.

The recording performance of two sets of samples is shown in FIGS. 9A and 9B. In FIG. 9A, the difference in the ΔSNR between the test samples and the control sample (i.e. sample C8 in Table 2) are plotted as a function of the HPRu interlayer thickness. Samples with a NiA-oxide layer also matched ΔSNR values observed in conventional media that lacked a second seed layer comprised of NiA-oxide (FIG. 9A). For layers 270-3 having a thickness between 8.2 and 10.3 nm, the samples with a NiA-oxide layer show higher OW2 in FIG. 9B. Thus, FIG. 9B illustrates that media with seed structure 250 demonstrated an overwrite gain in certain embodiments. The overwrite gain can be attributed to the addition of the ferromagnetic NiA-oxide layer, which effectively increases the total thickness of the seed layer. FIGS. 9A and 9B thus suggest that by incorporating a NiA-oxide layer into seed structure 250, a thinner HP Ru interlayer may be used to improve overwrite values without impairing the SNR of the media.

To further determine whether a thin interlayer 270 is desirable in media structure 200, overwrite and SNR characteristics were evaluated for C8 and E8 samples. The resulting data is summarized in Table 3 of FIG. 10. Sample C8 contained a single NiA seed layer of 4.8 nm thickness, and sample E8 contained a first seed layer 230 of NiA (4.8 nm thick) and a second seed layer 235 of NiA-X (1.1 nm thick). E8 exhibited an improved overwrite (OW2) higher than C8 by about 1.4 dB and an SNR that matched the SNR of sample C8. The OW2 gain observed in E8 is attributed to the fact that Ru layer 270-3 is thinner than the equivalent high pressure Ru layer in FIG. 1. Further, Table 3 indicates that C8 and E8 exhibit substantially similar MWW and MTW values. Based on the above results, including upper seed layer 235 in sample E8 provides an improved seed structure 250, which facilitates grain segregation in the recording layer. Therefore, it is believed that the use of a thinner HP Ru interlayer, in certain embodiments, will improve OW2 performance without adversely impacting SNR values.

Figure 11:
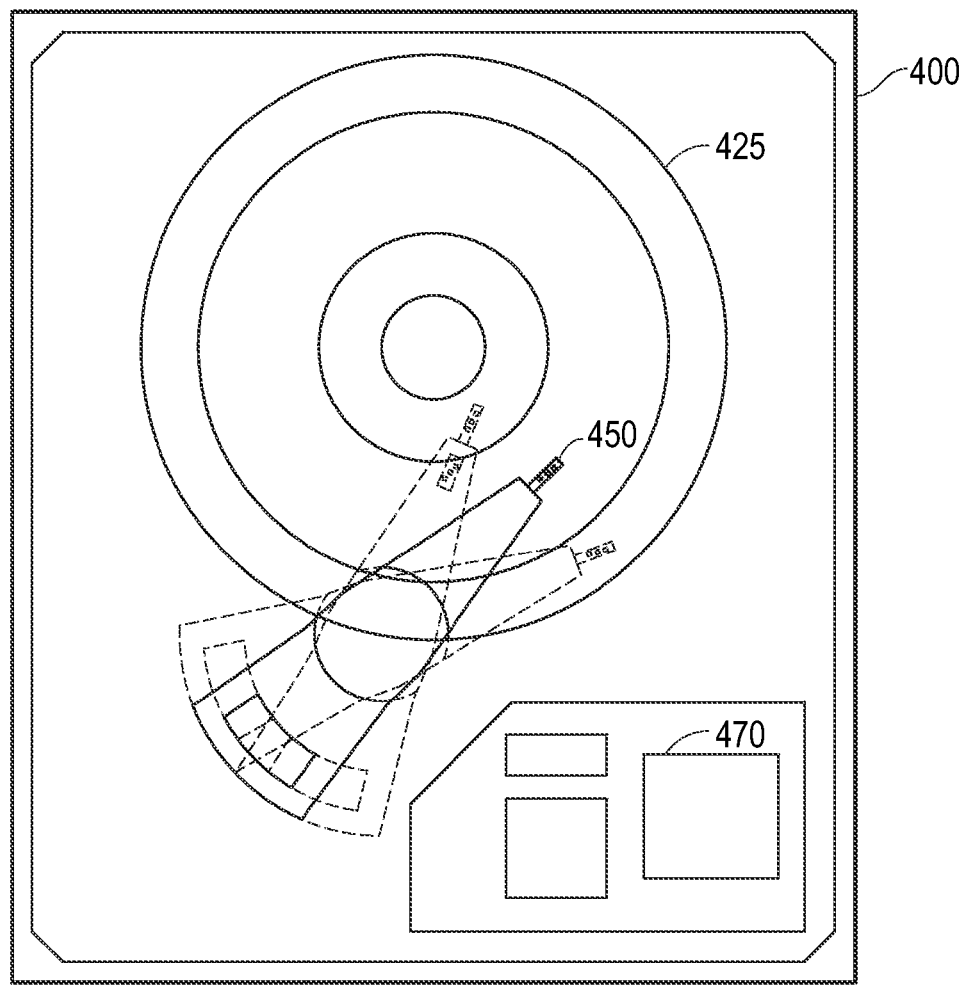
FIG. 11 illustrates a disk drive including a PMR disk in accordance with one embodiment.

FIG. 11 illustrates a disk drive having disk 425. Disk drive 400 may include one or more disks 425 to store datum. Data is stored along tracks in the magnetic recording layer of disk 425. The reading and writing of data is accomplished with head 450 that has both read and write elements. The write element is used to alter the properties of the perpendicular magnetic recording layer of disk 425. A spindle motor (not shown) rotates spindle assembly and, thereby, disk 425 to position head 450 at a particular location along a desired disk track. The position of head 450 relative to disk 425 may be controlled by position control circuitry 470.

Figure 12:
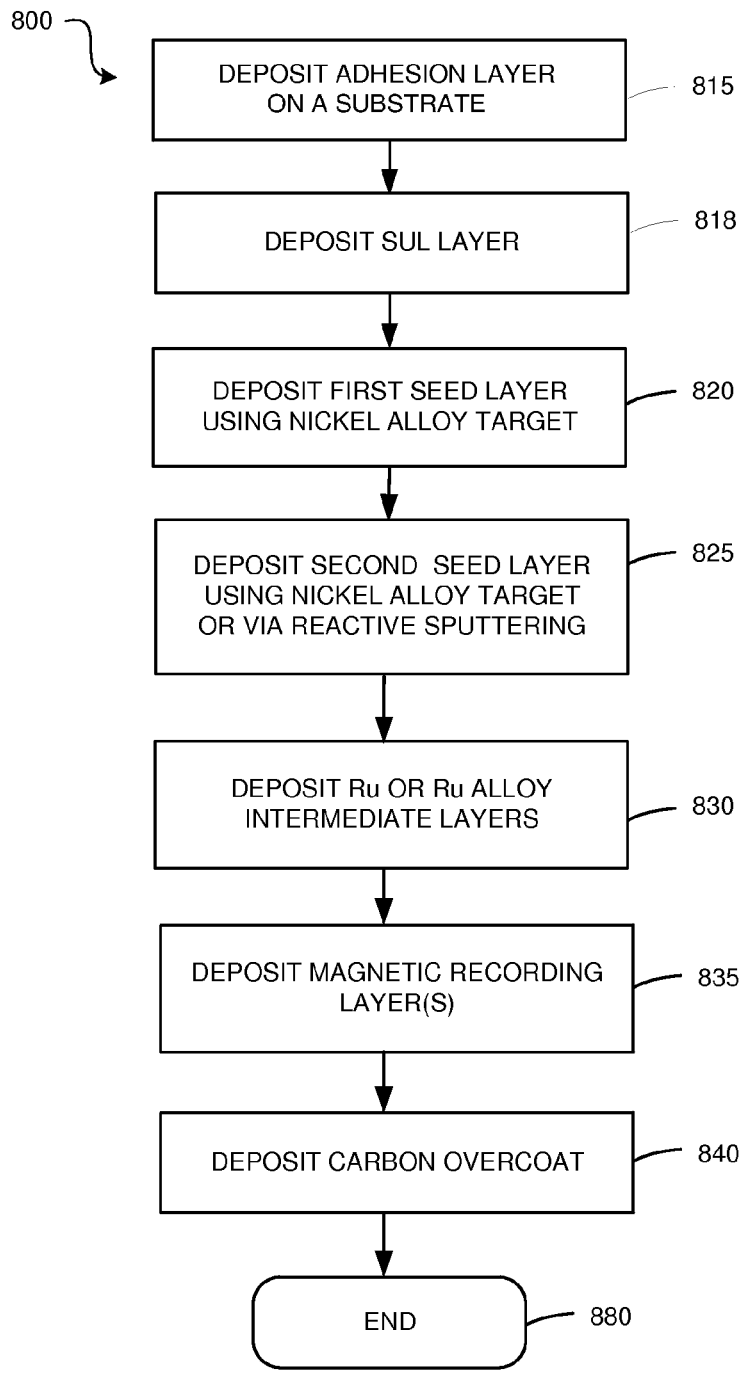
FIG. 12 illustrates one embodiment of a method of manufacturing perpendicular magnetic recording media in accordance with one embodiment.

FIG. 12 illustrates one embodiment of a method 800 for manufacturing a PMR disk having the media structure shown in FIG. 2. In one embodiment, various layers are deposited on a substrate 205. In operations 815 to 840, layers 220 through 290 are successively provided onto the medium via sputter deposition or via another suitable method. In some embodiments, substrate 205 may be plated and also polished and/or textured prior to deposition of layers 220 through 290. Further detail regarding each operation of method 800 is described below.

In operation 815, adhesion layer 220 is deposited on substrate 205. Then in operation 818, the SUL 225 is deposited over adhesion layer 220. The process proceeds with operation 820 where first seed layer 230 is deposited using a nickel alloy target. Subsequently, in operation 825, a second seed layer 235 is deposited on the first seed layer. The method of forming seed structure 250 can be readily implemented by using a target coated with nickel alloy for the first seed layer and a second target coated with the seed material for seed layer 235. Alternatively, Seed structure 250 can be formed by using a target coated with NiA-X to first deposit the lower seed layer 230 and then the upper seed layer 235 can be formed in the same chamber by means of reactive sputtering. Afterwards, in operation 830 an interlayer 270 structure of Ru or Ru alloy can be formed by changing a gas pressure during sputtering. Specifically, when the first interlayer 270-1 on the lower side of the interlayer 270 is to be formed, a gas pressure of Ar is set at a predetermined pressure, i.e., a low pressure ranging from 3 mTorr to 30 mTorr. When the second interlayer 270-2 in the middle of interlayer 270 is to be formed, the gas pressure is maintained at the same state for the first interlayer 270-1.

When the third interlayer 270-3 on the upper side of interlayer 270 is to be formed, the gas pressure of Ar is changed to a pressure that is higher than the pressure used to form the preceding interlayers 270-1 and 270-2. Suitable high pressures for third interlayer 270-3 range from 60 mTorr-150 mTorr. Instead of Ar, the sputtering gas may be a mixture of argon and oxygen. Thereafter, one or more recording layers 285 are deposited in operation 835. Thus, the crystal orientation of the recording layer 285 can be improved because of the first and second interlayers 270-1 and 270-2. The recording layer 285 is provided with a carbon protective layer in operation 840, such as a DLC layer, to protect layer 285 from damage. In several embodiments, the use of the methods discussed in association with FIG. 12 has been shown to improve the performance of PMR medium 200.

The above detailed description is provided to enable any person skilled in the art to practice the various embodiments described herein. While several embodiments have been particularly described with reference to the various figures, it should be understood that these are for illustration purposes only.

Various modifications to these embodiments will be readily apparent to those skilled in the art, and generic principles defined herein may be applied to other embodiments. For example, although the first seed layer is based on nickel or nickel alloys, other metallic elements such as copper or copper alloys may work as well. Thus, many changes and modifications may be made to the embodiments described herein, by one having ordinary skill in the art, without departing from the spirit and scope of the claims set forth below.

What is claimed:

1. A data storage medium comprising:
a seed structure above a substrate, the seed structure being formed of a first seed layer comprising a nickel alloy NiA, and a second seed layer comprising a nickel alloy $Ni_{1-(m+n)}A_mX_n$, where A is one or more elements selected from the group consisting of Al, B, Fe, Nb, W, and Co, and X is an oxide, where m is a value between 0.10-0.50 and n is a value between 0.01-0.10, and wherein the second seed layer is disposed on top of the first seed layer; and
a magnetic recording layer above the seed structure.

2. The data storage medium of claim 1 wherein the nickel alloy of the first seed layer is further represented by $Ni_{1-p}A_p$ where p is between 0.10-0.50.

3. The data storage medium of claim 1 wherein the first seed layer has a saturation induction greater than 5 kG.

4. The data storage medium of claim 1 wherein the oxide of the second seed layer is selected from at least one oxide from the group consisting of TiO2, SiO2, CrO2, Cr2O3, Al2O3, ZrO2, Ta2O5, Nb2O5, V2O5, MgO, Mg2B2O5, MnO, WO3, HfO2, and B2O3.

5. The data storage medium of claim 1 further comprising an intermediate layer on top of the seed structure, wherein the intermediate layer includes multiple layers of ruthenium or ruthenium alloys, and wherein one of the ruthenium-containing layers is a high pressure ruthenium layer having a thickness between about 3 nm to about 12 nm.

6. The data storage medium of claim 1 wherein the seed structure has a thickness between about 3 nm to about 13 nm.

7. A data storage medium comprising:
a soft magnetic underlayer (SUL) formed over a substrate;
a seed structure above the SUL, the seed structure being formed of a first seed layer comprising a nickel alloy NiY, where Y is an element selected from the group consisting of Al, B, Fe, Nb, W, and Co, and a second seed layer comprising a nickel alloy NiWAX, where A is an element selected from the group consisting of Al, B, Fe, Nb, and Co, and X is either B, Si, Ti, Nb, V, Cr, Ru, or an oxide, and
wherein the second seed layer is disposed on top of the first seed layer, and contains one or more oxides selected from the group consisting of TiO2, SiO$_2$, CrO2, Cr2O3, Al2O3, ZrO2, Ta2O5, Nb2O5, V2O5, MgO, Mg2B2O5, MnO, WO3, HfO2, and B2O3; and
a magnetic recording layer above the seed structure.

8. The data storage medium of claim 7 wherein the first seed layer is further represented by $Ni_{1-q}Y_q$ the value of q is between 0.10-0.50.

9. The data storage medium of claim 7 wherein the first seed layer has a saturation induction greater than 5 kG.

10. The data storage medium of claim 7 wherein the second seed layer is further represented by $Ni_{1-(l+h+k)}W_lA_hX_k$, where l is a value between 0.01-0.10, h is a value between 0.10-0.40, and k is a value between 0.01-0.10.

11. The data storage medium of claim 7 further comprising an intermediate layer on the seed structure, wherein the intermediate layer includes multiple layers of ruthenium or ruthenium alloys, and wherein one of the ruthenium layers is a high pressure ruthenium layer having a thickness between about 3 nm to about 12 nm.

12. The data storage medium of claim 7 wherein the seed structure has a thickness between about 3 nm to about 13 nm.

13. An apparatus comprising:
a transducer head having a magnetoresistive read element; and
the data storage medium of claim 7 coupled to the transducer head.

14. A method of manufacturing a data storage medium comprising;
forming a soft under layer (SUL) above a substrate;
forming a seed structure above the SUL, the seed structure being formed of a first seed layer comprising a nickel alloy $Ni_{1-q}Y_q$, where Y is an element selected from the group consisting of Al, B, Fe, Nb, W, and Co, and a second seed layer comprising a nickel alloy $Ni_{1-(l+h+k)}W_lA_hX_k$, where A is an element selected from the group consisting of Al, B, Fe, Nb, and Co and X is either B, Si, Ti, Nb, V, Cr, Ru, or an oxide,
wherein the second seed layer is disposed on top of the first seed layer, and contains one or more oxides selected from the group consisting of TiO2, SiO2, CrO2, Cr2O3, Al2O3, ZrO2, Ta2O5, Nb2O5, V2O5, MgO, Mg2B2O5, MnO, WO3, HfO2, and B2O3; and
forming a magnetic recording layer above the seed structure.

15. The method of claim 14 wherein the seed structure has a thickness between about 3 nm to about 13 nm.

16. The method of claim 14 wherein the second seed layer is sputter deposited in a chamber maintained at a low pressure of from 3 mTorr to 30 mTorr using a NiWAX target.

17. The method of claim 14 wherein the second seed layer is reactively sputter deposited using a NiWAX target in the presence of argon and oxygen gas.

18. The method of claim 14 further comprising depositing multiple intermediate layers of ruthenium or ruthenium alloys, wherein at least one of the intermediate layers is deposited in a chamber maintained at a high pressure of from 60 mTorr to 150 mTorr.

19. The method of claim 14 wherein the recording layer is part of a perpendicular magnetic recording medium.

20. The data storage medium of claim 1 wherein the magnetic recording layer comprises a hexagonal close-packed (hcp) texture, and wherein the first seed layer and second seed layer are configured to impart the hcp texture in the magnetic recording layer.

21. The data storage medium of claim 20 wherein the hcp texture is a hcp (0002) texture.

22. The data storage medium of claim 20 wherein the first seed layer and second seed layer each comprise a (111) orientation.

23. The data storage medium of claim 1 wherein the first seed layer and second seed layer each comprise a (111) orientation.

24. The data storage medium of claim 1 wherein the first seed layer is configured to impart a face-centered cubic (111) orientation in the second seed layer.

25. A disk drive comprising:
a data storage medium; and
a head configured to read data stored in the data storage medium,
wherein the data storage medium comprises:
a seed structure above a substrate, the seed structure being formed of a first seed layer comprising a nickel alloy NiA, and a second seed layer comprising a nickel alloy $Ni_{1-(m+n)}A_mX_n$, where A is one or more elements selected from the group consisting of Al, B, Fe, Nb, W, and Co, and X is an oxide, where m is a value between 0.10-0.50 and n is a value between 0.01-0.10, and wherein the second seed layer is disposed on top of the first seed layer; and
a magnetic recording layer above the seed structure.

26. A disk drive comprising:
a data storage medium; and
a head configured to read data stored in the data storage medium,
wherein the data storage medium comprises:
a soft magnetic underlayer (SUL) formed over a substrate;
a seed structure above the SUL, the seed structure being formed of a first seed layer comprising a nickel alloy NiY, where Y is an element selected from the group consisting of Al, B, Fe, Nb, W, and Co, and a second seed layer comprising a nickel alloy NiWAX, where A is an element selected from the group consisting of Al, B, Fe, Nb, and Co, and X is either B, Si, Ti, Nb, V, Cr, Ru, or an oxide, and
wherein the second seed layer is disposed on top of the first seed layer, and contains one or more oxides selected from the group consisting of TiO2, SiO$_2$, CrO2, Cr2O3, Al2O3, ZrO2, Ta2O5, Nb2O5, V2O5, MgO, Mg2B2O5, MnO, WO3, HfO2, and B2O3; and
a magnetic recording layer above the seed structure.

\* \* \* \* \*